US010397670B2

(12) United States Patent
Gorius et al.

(10) Patent No.: US 10,397,670 B2
(45) Date of Patent: Aug. 27, 2019

(54) TECHNIQUES TO PROCESS PACKETS IN A DUAL-MODE SWITCHING ENVIRONMENT

(71) Applicant: INTEL CORPORATION, Santa Clara, CA (US)

(72) Inventors: Aaron Gorius, Upton, MA (US); Myles Wilde, Charlestown, MA (US); Matthew J. Adiletta, Bolton, MA (US)

(73) Assignee: Intel Corporation, Santa Clara, CA (US)

(*) Notice: Subject to any disclaimer, the term of this patent is extended or adjusted under 35 U.S.C. 154(b) by 27 days.

(21) Appl. No.: 15/425,916

(22) Filed: Feb. 6, 2017

(65) Prior Publication Data

US 2018/0026882 A1 Jan. 25, 2018

Related U.S. Application Data

(60) Provisional application No. 62/427,268, filed on Nov. 29, 2016, provisional application No. 62/376,859, (Continued)

(51) Int. Cl.
*H03M 7/40* (2006.01)
*H04L 12/24* (2006.01)
(Continued)

(52) U.S. Cl.
CPC ...... *H04Q 11/0005* (2013.01); *B25J 15/0014* (2013.01); *B65G 1/0492* (2013.01); *G02B 6/3882* (2013.01); *G02B 6/3893* (2013.01); *G02B 6/3897* (2013.01); *G02B 6/4292* (2013.01); *G02B 6/4452* (2013.01); *G05D 23/1921* (2013.01); *G05D 23/2039* (2013.01); *G06F 1/183* (2013.01); *G06F 3/061* (2013.01); *G06F 3/064* (2013.01); *G06F 3/067* (2013.01); *G06F 3/0611* (2013.01); *G06F 3/0613* (2013.01); *G06F 3/0616* (2013.01); *G06F 3/0619* (2013.01); *G06F 3/0625* (2013.01); *G06F 3/0631* (2013.01); *G06F 3/0638* (2013.01); *G06F 3/0647* (2013.01);
(Continued)

(58) Field of Classification Search
CPC ......... H04B 10/03; H04B 10/40; H04L 49/15; H04L 49/65; H04L 49/351; H04L 49/602
See application file for complete search history.

(56) References Cited

U.S. PATENT DOCUMENTS

| | | | | |
|---|---|---|---|---|
| 6,175,902 B1 * | 1/2001 | Runaldue | G06F 12/128 370/230 |
| 2005/0132089 A1 * | 6/2005 | Bodell | G06F 13/385 709/249 |

(Continued)

OTHER PUBLICATIONS

International Search Report received for PCT Patent Application No. PCT/US2017/038652, dated Oct. 19, 2017, 4 pages.

*Primary Examiner* — Un C Cho
*Assistant Examiner* — Peter K Mak
(74) *Attorney, Agent, or Firm* — Barnes & Thornburg LLP

(57) ABSTRACT

Various embodiments are generally directed to an apparatus, method and other techniques to receive a packet via an optical fabric, the packet comprising a switch mode indicator, determine a switch mode for the packet based on the switch mode indicator, and process the packet in accordance with a first protocol or a second protocol based on the switch mode.

27 Claims, 17 Drawing Sheets

Related U.S. Application Data filed on Aug. 18, 2016, provisional application No. 62/365,969, filed on Jul. 22, 2016.

(51) Int. Cl.

| | |
|---|---|
| ***H04L 12/931*** | (2013.01) |
| ***H04L 12/851*** | (2013.01) |
| ***H04L 12/781*** | (2013.01) |
| ***G06F 13/40*** | (2006.01) |
| ***H04Q 11/00*** | (2006.01) |
| ***H04B 10/25*** | (2013.01) |
| ***H03M 7/30*** | (2006.01) |
| ***G06F 16/901*** | (2019.01) |
| ***G06F 3/06*** | (2006.01) |
| ***G11C 7/10*** | (2006.01) |
| ***H05K 7/14*** | (2006.01) |
| ***G06F 1/18*** | (2006.01) |
| ***H05K 5/02*** | (2006.01) |
| ***G08C 17/02*** | (2006.01) |
| ***H04L 29/08*** | (2006.01) |
| ***H04L 12/26*** | (2006.01) |
| ***G06F 9/50*** | (2006.01) |
| ***H04L 12/911*** | (2013.01) |
| ***G06F 12/109*** | (2016.01) |
| ***H04L 29/06*** | (2006.01) |
| ***G11C 14/00*** | (2006.01) |
| ***G11C 5/02*** | (2006.01) |
| ***G11C 11/56*** | (2006.01) |
| ***G02B 6/44*** | (2006.01) |
| ***G06F 8/65*** | (2018.01) |
| ***G06F 12/14*** | (2006.01) |
| ***G06F 13/16*** | (2006.01) |
| ***G06F 9/4401*** | (2018.01) |
| ***G02B 6/38*** | (2006.01) |
| ***G02B 6/42*** | (2006.01) |
| ***B25J 15/00*** | (2006.01) |
| ***B65G 1/04*** | (2006.01) |
| ***H05K 7/20*** | (2006.01) |
| ***H04L 12/939*** | (2013.01) |
| ***H04W 4/02*** | (2018.01) |
| ***H04L 12/751*** | (2013.01) |
| ***G06F 13/42*** | (2006.01) |
| ***H05K 1/18*** | (2006.01) |
| ***G05D 23/19*** | (2006.01) |
| ***G05D 23/20*** | (2006.01) |
| ***H04L 12/927*** | (2013.01) |
| ***H05K 1/02*** | (2006.01) |
| ***H04Q 1/04*** | (2006.01) |
| ***G06F 12/0893*** | (2016.01) |
| ***H05K 13/04*** | (2006.01) |
| ***G11C 5/06*** | (2006.01) |
| ***G06F 11/14*** | (2006.01) |
| ***G06F 11/34*** | (2006.01) |
| ***G06F 12/0862*** | (2016.01) |
| ***G06F 15/80*** | (2006.01) |
| ***H04L 12/919*** | (2013.01) |
| ***G06F 12/10*** | (2016.01) |
| ***G06Q 10/06*** | (2012.01) |
| ***G07C 5/00*** | (2006.01) |
| ***H04L 12/28*** | (2006.01) |
| ***H04L 29/12*** | (2006.01) |
| ***H04L 9/06*** | (2006.01) |
| ***H04L 9/14*** | (2006.01) |
| ***H04L 9/32*** | (2006.01) |
| ***H04L 12/933*** | (2013.01) |
| ***H04L 12/947*** | (2013.01) |
| ***H04L 12/811*** | (2013.01) |
| *H04W 4/80* | (2018.01) |
| *G06Q 10/08* | (2012.01) |
| *G06Q 10/00* | (2012.01) |
| *G06Q 50/04* | (2012.01) |

(52) U.S. Cl.

CPC .......... *G06F 3/0653* (2013.01); *G06F 3/0655* (2013.01); *G06F 3/0658* (2013.01); *G06F 3/0659* (2013.01); *G06F 3/0664* (2013.01); *G06F 3/0665* (2013.01); *G06F 3/0673* (2013.01); *G06F 3/0679* (2013.01); *G06F 3/0683* (2013.01); *G06F 3/0688* (2013.01); *G06F 3/0689* (2013.01); *G06F 8/65* (2013.01); *G06F 9/4401* (2013.01); *G06F 9/505* (2013.01); *G06F 9/5016* (2013.01); *G06F 9/5044* (2013.01); *G06F 9/5072* (2013.01); *G06F 9/5077* (2013.01); *G06F 11/141* (2013.01); *G06F 11/3414* (2013.01); *G06F 12/0862* (2013.01); *G06F 12/0893* (2013.01); *G06F 12/10* (2013.01); *G06F 12/109* (2013.01); *G06F 12/1408* (2013.01); *G06F 13/161* (2013.01); *G06F 13/1668* (2013.01); *G06F 13/1694* (2013.01); *G06F 13/409* (2013.01); *G06F 13/4022* (2013.01); *G06F 13/4068* (2013.01); *G06F 13/42* (2013.01); *G06F 13/4282* (2013.01); *G06F 15/8061* (2013.01); *G06F 16/9014* (2019.01); *G06Q 10/06* (2013.01); *G06Q 10/06314* (2013.01); *G07C 5/008* (2013.01); *G08C 17/02* (2013.01); *G11C 5/02* (2013.01); *G11C 5/06* (2013.01); *G11C 7/1072* (2013.01); *G11C 11/56* (2013.01); *G11C 14/0009* (2013.01); *H03M 7/30* (2013.01); *H03M 7/3084* (2013.01); *H03M 7/3086* (2013.01); *H03M 7/40* (2013.01); *H03M 7/4031* (2013.01); *H03M 7/4056* (2013.01); *H03M 7/4081* (2013.01); *H03M 7/6005* (2013.01); *H03M 7/6023* (2013.01); *H04B 10/2504* (2013.01); *H04L 9/0643* (2013.01); *H04L 9/14* (2013.01); *H04L 9/3247* (2013.01); *H04L 9/3263* (2013.01); *H04L 12/2809* (2013.01); *H04L 29/12009* (2013.01); *H04L 41/024* (2013.01); *H04L 41/046* (2013.01); *H04L 41/082* (2013.01); *H04L 41/0813* (2013.01); *H04L 41/0896* (2013.01); *H04L 41/145* (2013.01); *H04L 41/147* (2013.01); *H04L 43/08* (2013.01); *H04L 43/0817* (2013.01); *H04L 43/0876* (2013.01); *H04L 43/0894* (2013.01); *H04L 43/16* (2013.01); *H04L 45/02* (2013.01); *H04L 45/52* (2013.01); *H04L 47/24* (2013.01); *H04L 47/38* (2013.01); *H04L 47/765* (2013.01); *H04L 47/782* (2013.01); *H04L 47/805* (2013.01); *H04L 47/82* (2013.01); *H04L 47/823* (2013.01); *H04L 49/15* (2013.01); *H04L 49/25* (2013.01); *H04L 49/357* (2013.01); *H04L 49/45* (2013.01); *H04L 49/555* (2013.01); *H04L 67/02* (2013.01); *H04L 67/10* (2013.01); *H04L 67/1004* (2013.01); *H04L 67/1008* (2013.01); *H04L 67/1012* (2013.01); *H04L 67/1014* (2013.01); *H04L 67/1029* (2013.01); *H04L 67/1034* (2013.01); *H04L 67/1097* (2013.01); *H04L 67/12* (2013.01); *H04L 67/16* (2013.01); *H04L 67/306* (2013.01); *H04L 67/34*

(2013.01); *H04L 69/04* (2013.01); *H04L 69/329* (2013.01); *H04Q 1/04* (2013.01); *H04Q 11/00* (2013.01); *H04Q 11/0003* (2013.01); *H04Q 11/0062* (2013.01); *H04Q 11/0071* (2013.01); *H04W 4/023* (2013.01); *H05K 1/0203* (2013.01); *H05K 1/181* (2013.01); *H05K 5/0204* (2013.01); *H05K 7/1418* (2013.01); *H05K 7/1421* (2013.01); *H05K 7/1422* (2013.01); *H05K 7/1447* (2013.01); *H05K 7/1461* (2013.01); *H05K 7/1487* (2013.01); *H05K 7/1489* (2013.01); *H05K 7/1491* (2013.01); *H05K 7/1492* (2013.01); *H05K 7/1498* (2013.01); *H05K 7/2039* (2013.01); *H05K 7/20709* (2013.01); *H05K 7/20727* (2013.01); *H05K 7/20736* (2013.01); *H05K 7/20745* (2013.01); *H05K 7/20836* (2013.01); *H05K 13/0486* (2013.01); *G06F 2209/5019* (2013.01); *G06F 2209/5022* (2013.01); *G06F 2212/1008* (2013.01); *G06F 2212/1024* (2013.01); *G06F 2212/1041* (2013.01); *G06F 2212/1044* (2013.01); *G06F 2212/152* (2013.01); *G06F 2212/202* (2013.01); *G06F 2212/401* (2013.01); *G06F 2212/402* (2013.01); *G06F 2212/7207* (2013.01); *G06Q 10/087* (2013.01); *G06Q 10/20* (2013.01); *G06Q 50/04* (2013.01); *G08C 2200/00* (2013.01); *H04B 10/25* (2013.01); *H04L 41/12* (2013.01); *H04L 41/5019* (2013.01); *H04L 43/065* (2013.01); *H04Q 2011/0037* (2013.01); *H04Q 2011/0041* (2013.01); *H04Q 2011/0052* (2013.01); *H04Q 2011/0073* (2013.01); *H04Q 2011/0079* (2013.01); *H04Q 2011/0086* (2013.01); *H04Q 2213/13523* (2013.01); *H04Q 2213/13527* (2013.01); *H04W 4/80* (2018.02); *H05K 7/1485* (2013.01); *H05K 2201/066* (2013.01); *H05K 2201/10121* (2013.01); *H05K 2201/10159* (2013.01); *H05K 2201/10189* (2013.01); *Y02D 10/14* (2018.01); *Y02D 10/151* (2018.01); *Y02P 90/30* (2015.11); *Y10S 901/01* (2013.01)

(56) References Cited

U.S. PATENT DOCUMENTS

2008/0151899 A1 6/2008 Li
2009/0106439 A1 4/2009 Twitchell, Jr.
2011/0026393 A1* 2/2011 Petersen ................. H04L 45/02 370/217
2013/0094856 A1* 4/2013 Chen ....................... H04L 45/62 398/48
2013/0163605 A1 6/2013 Chandra et al.
2014/0105226 A1 4/2014 Ganesh et al.
2014/0140689 A1* 5/2014 Dahlfort ................ H04B 10/40 398/2
2015/0350111 A1* 12/2015 Xiu ....................... H04L 12/413 370/254
2017/0052916 A1* 2/2017 Kollu .................. G06F 13/4022
2017/0085472 A1* 3/2017 Roberts ................... H04L 45/52

* cited by examiner

Data Center 300

Connectivity Scheme
1200

Packet 1300

Header 1302

SMI 1304

Address 1306

Data 1308

ECC/CRC 1310

FIG. 13

TECHNIQUES TO PROCESS PACKETS IN A DUAL-MODE SWITCHING ENVIRONMENT

CROSS-REFERENCE TO RELATED CASE

This application claims priority to U.S. Provisional Patent Application entitled "Framework and Techniques for Pools of Configurable Computing Resources" filed on Nov. 29, 2016 and assigned Ser. No. 62/427,268; U.S. Provisional Patent Application entitled "Scalable System Framework Prime (SSFP) Omnibus Provisional II" filed on Aug. 18, 2016 and assigned Ser. No. 62/376,859; and U.S. Provisional Patent Application entitled "Framework and Techniques for Pools of Configurable Computing Resources" filed on Jul. 22, 2016 and assigned Ser. No. 62/365,969, each of which is hereby incorporated by reference in their entirety.

TECHNICAL FIELD

Embodiments described herein generally include determining a switch mode to process a packet and processing the packet based on the determination.

BACKGROUND

Current computing data center solutions typically include a number of servers having devices, such as memory, storage, processors, etc, physically located on multiple racks. These servers are generally configured in an identical manner so that software can run on any of the servers. However, this can be expensive in both money and power consumption. Further, not all software requires all of these devices. An alternative approach is to move the devices off the server and place them on the network as a shared resource for any server to access. However, the problem with this approach is that Ethernet networks, which are typically used in computing data centers, having very high latency that impedes performance.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 13 illustrates an example of a packet.

DETAILED DESCRIPTION

Figure 1:
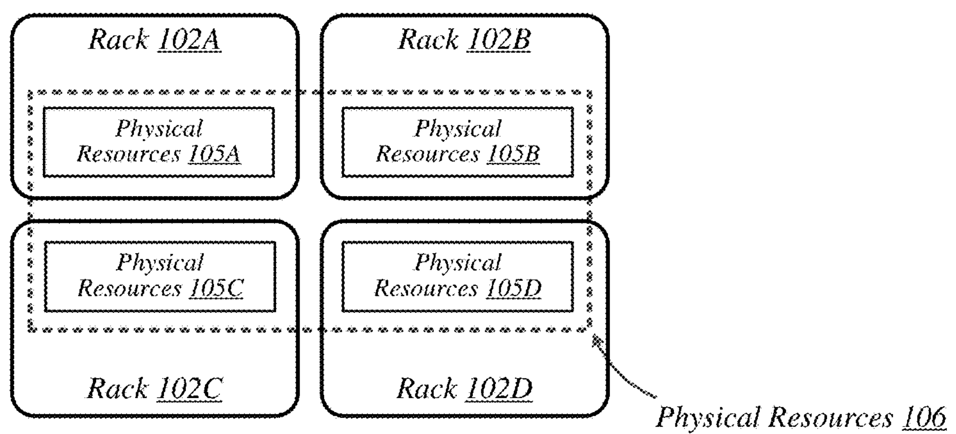
FIG. 1 illustrates an example of a data center.

Various embodiments may be generally directed to supporting both Ethernet and low latency networking, such as high-performance computing (HPC) or other low latency protocols, via a dual-mode optical switching infrastructure. A data center, as discussed herein, may include a number of physical resources coupled via an optical fabric, which may support Ethernet links and low latency links using a single optical medium. Thus, one network may support dual networking protocols, including the Ethernet protocol and a low latency protocol, such as an HPC protocol or other proprietary low latency protocols.

The data center may include a number of switches that couple the physical resources and be part of the dual-mode optical switching infrastructure. These switches may include circuitry to process communications sent using the Ethernet protocol or the low latency protocol. For example, a switch may receive a packet and determine a switch mode for the packet based on an indication in the packet. Moreover, the packet may include a switch mode indicator indicating whether the packet is to be processed in accordance with an Ethernet protocol or a low latency protocol. The switch may process the packet accordingly, e.g. using the Ethernet protocol or low latency protocol, and send the packet to its destination using the appropriate data path, as will be discussed in more detail below.

Further, embodiments include sleds having the physical resources capable of send and receiving communications via the dual-mode optical switching infrastructure. These sleds may include circuitry capable of receiving a packet, determining a protocol for the packet, and processing it accordingly. Further, the sled may also include circuitry to prepare data for communication, generate a packet with a switch mode indicator, and send the packet to a destination. These and other details will become more apparent in the following description.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources (PCRs) 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance. In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet, Omni-Path, or other proprietary low latency network architectures. The sleds, in the illustrative embodiment, are coupled to switches via optical fibers, which provide higher bandwidth and lower latency than typical twister pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

Figure 2:
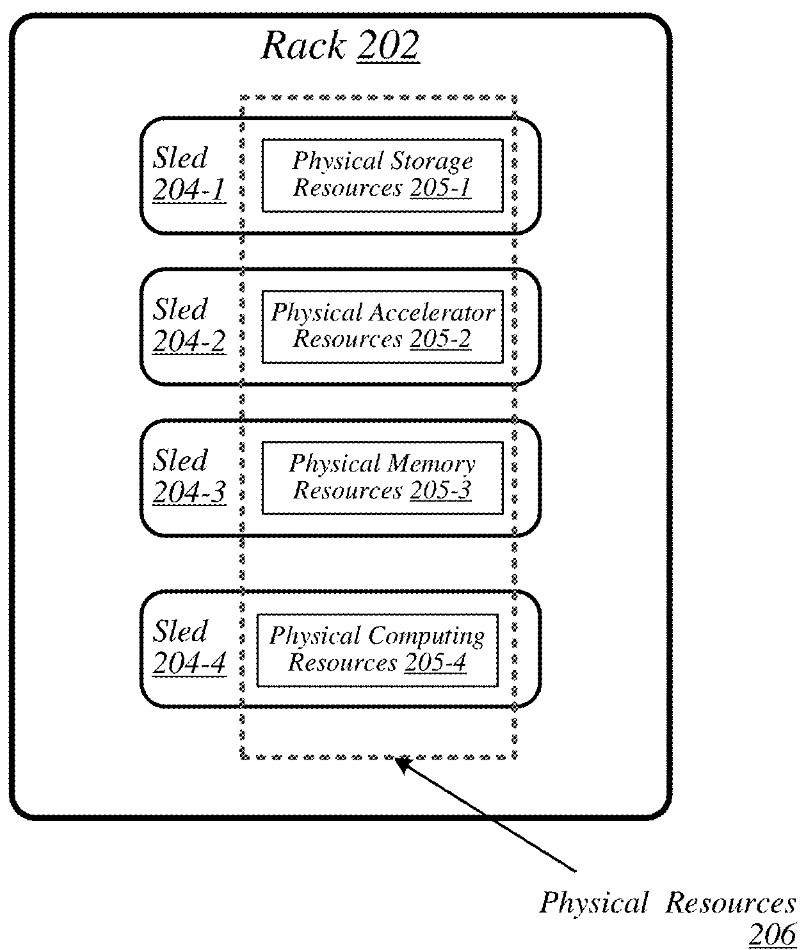
FIG. 2 illustrates an example of a rack.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies. Further, the higher voltages enable less power loss in the system making it more efficient. FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 204-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulable sleds comprising disaggregated resources, each type of resource can be upgraded or replaced independently of each other and at their own optimized refresh rate.

Figure 3:
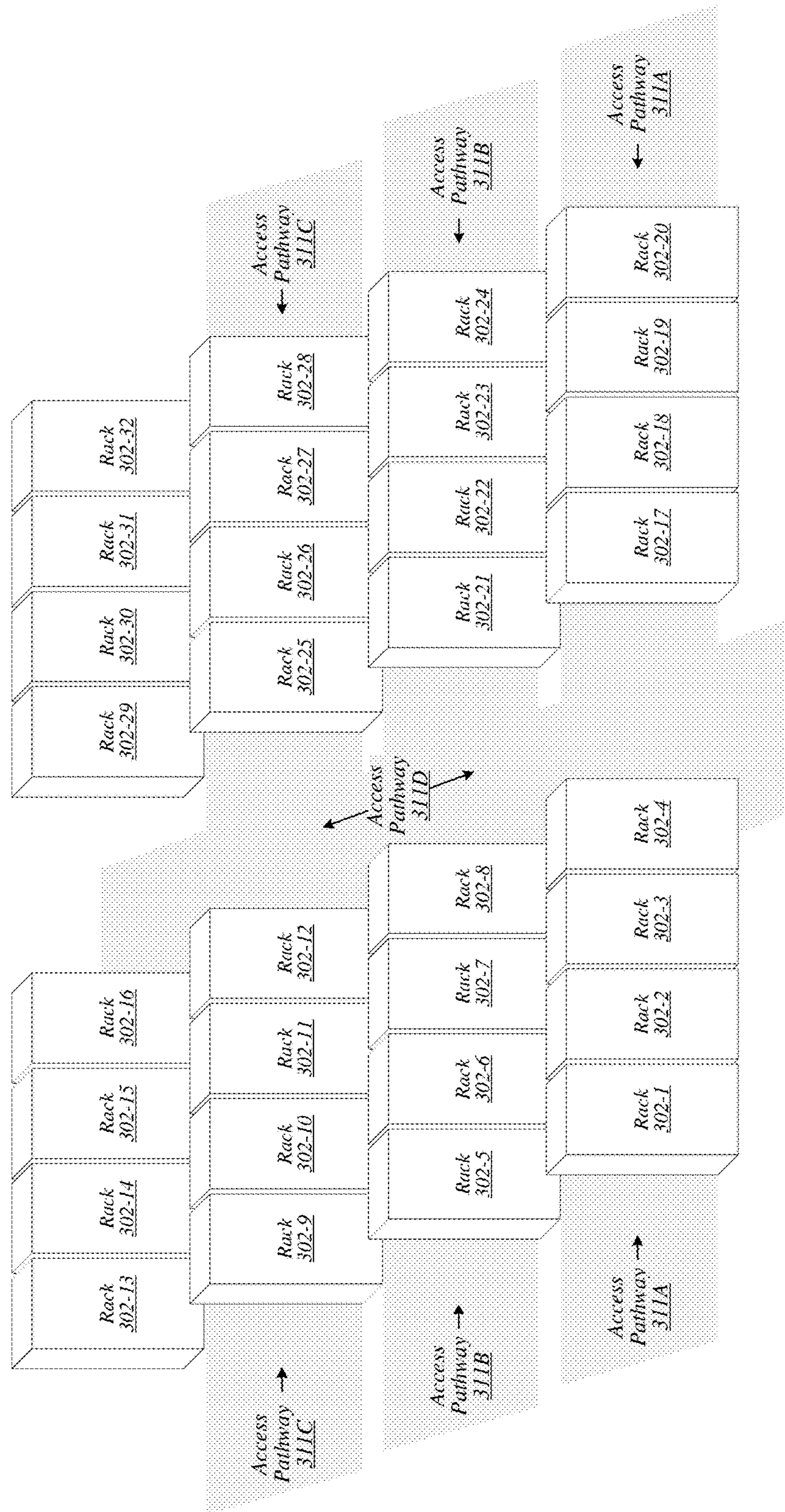
FIG. 3 illustrates an example of a data center.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
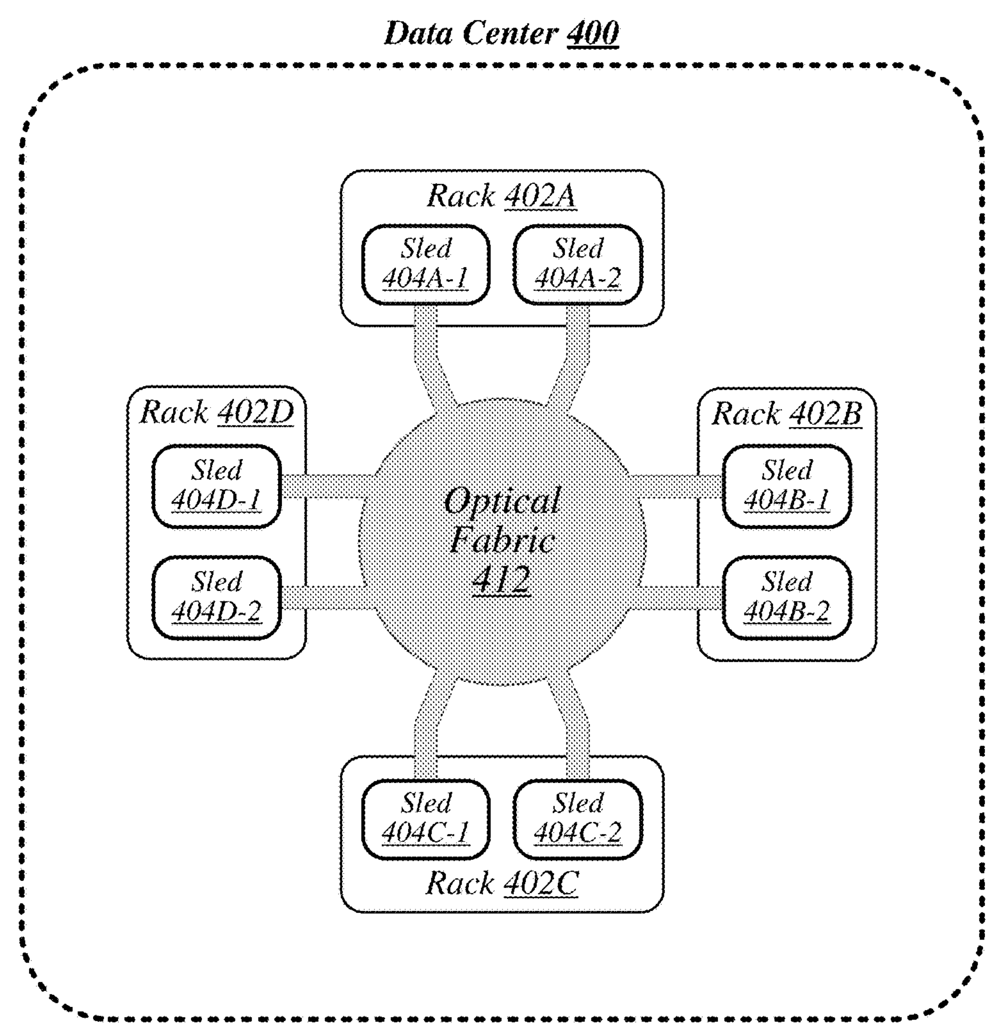
FIG. 4 illustrates an example of a data center.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
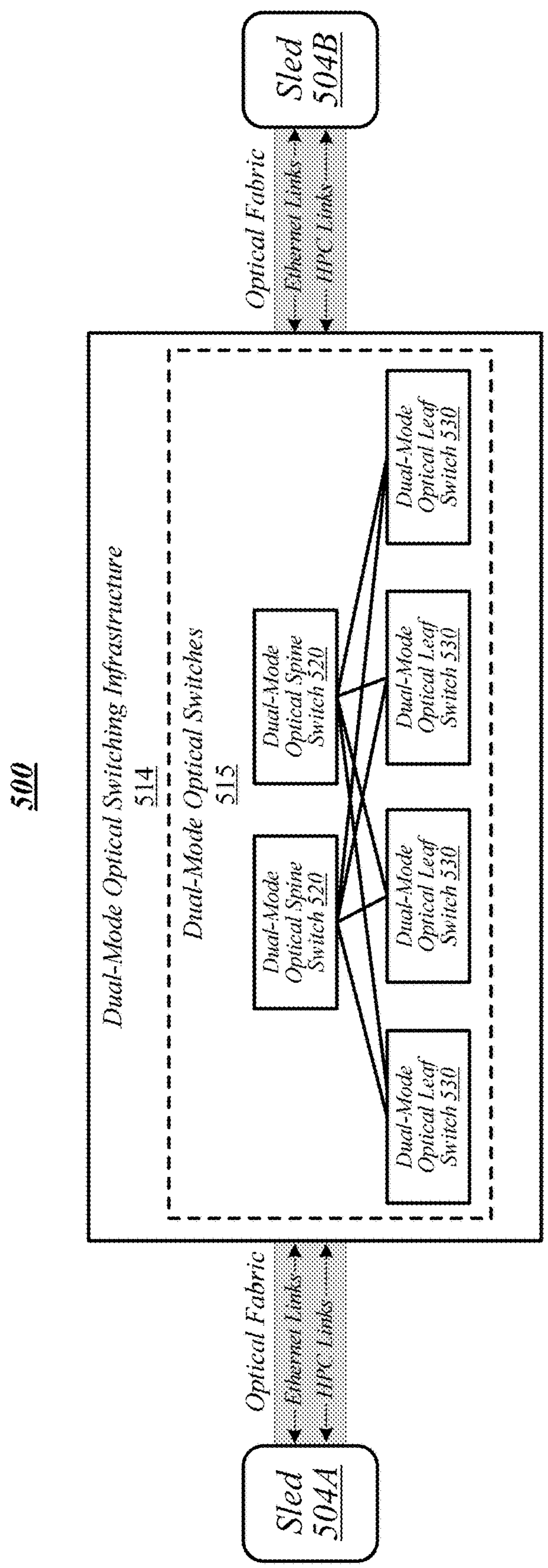
FIG. 5 illustrates an example of a switching infrastructure.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband, or other low latency protocols) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
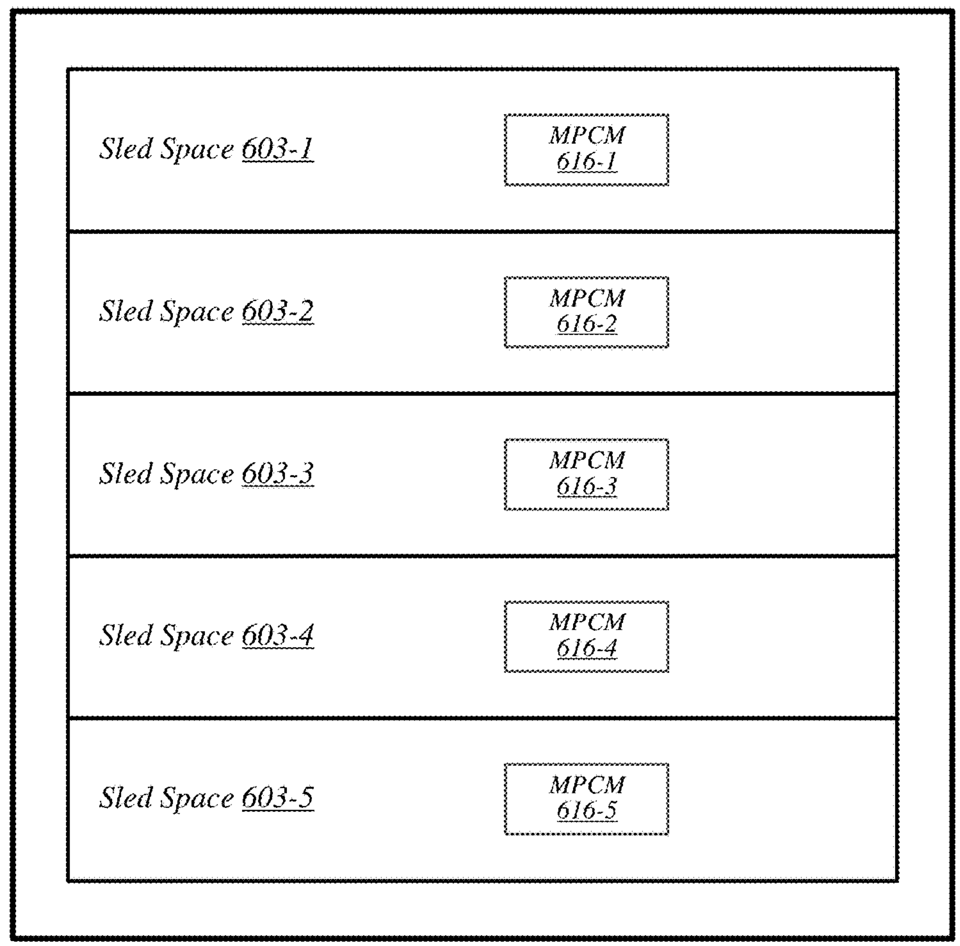
FIG. 6 illustrates an example of a data center.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5. In some instances, when a sled is inserted into any given one of sled spaces 603-1 to 603-5, the corresponding MPCM may couple with a counterpart MPCM of the inserted sled. This coupling may provide the inserted sled with connectivity to both signaling infrastructure and power infrastructure of the rack in which it is housed.

Figure 7:
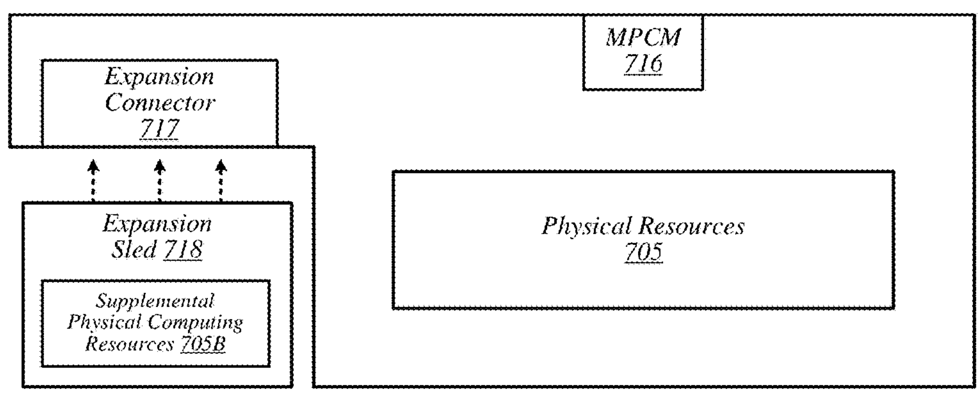
FIG. 7 illustrates an example of a sled.

Included among the types of sleds to be accommodated by rack architecture 600 may be one or more types of sleds that feature expansion capabilities. FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
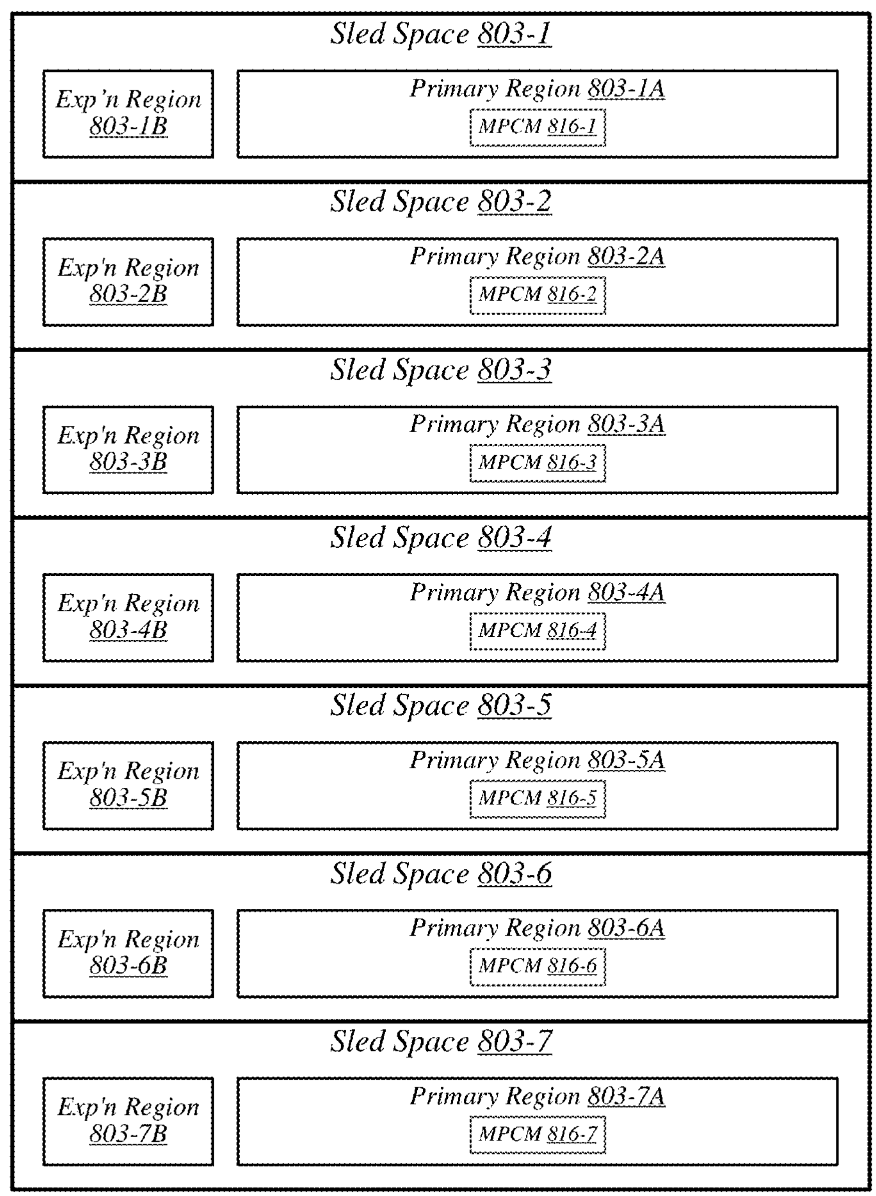
FIG. 8 illustrates an example of a data center.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
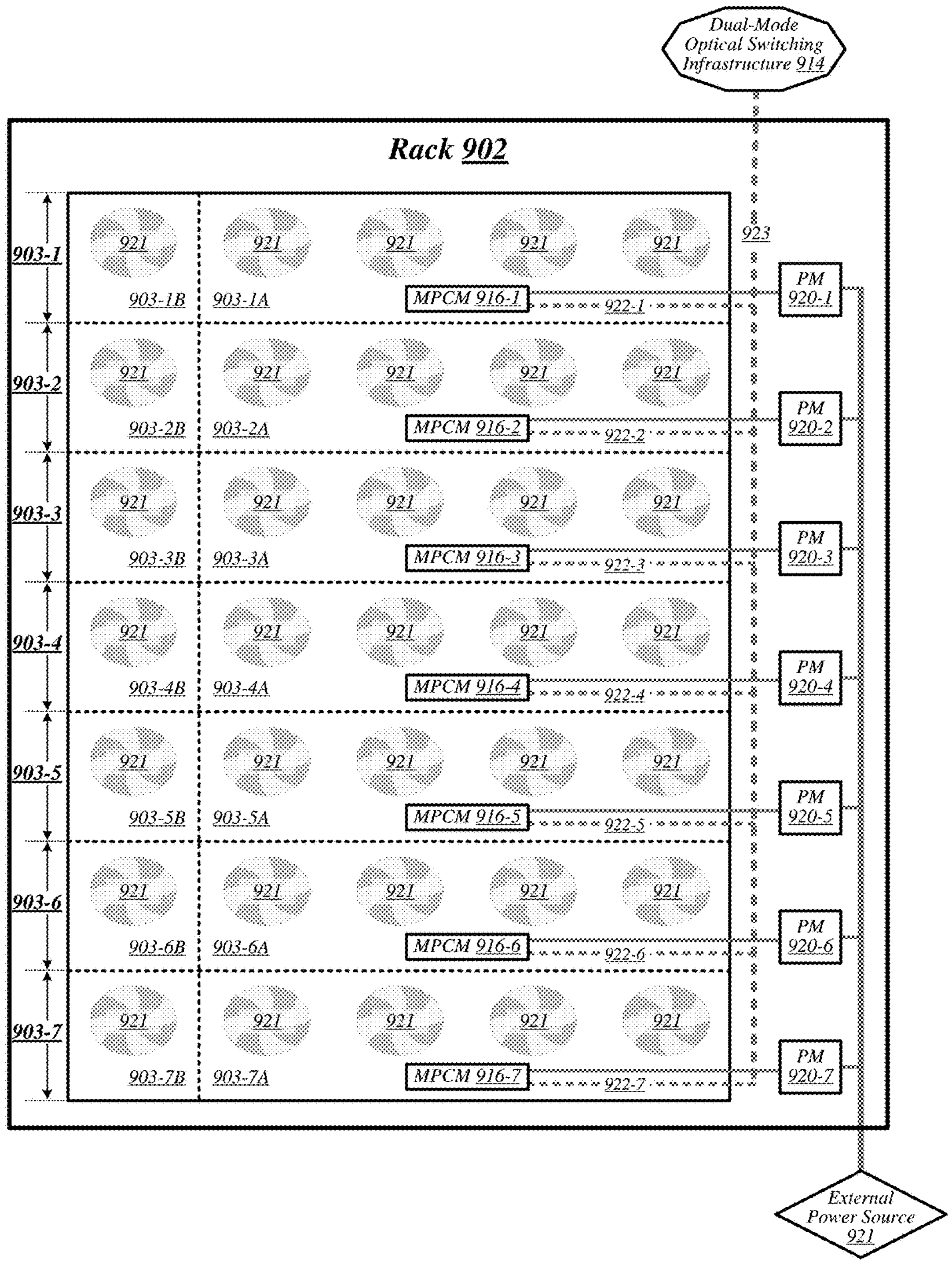
FIG. 9 illustrates an example of a data center.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1 U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W or greater) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
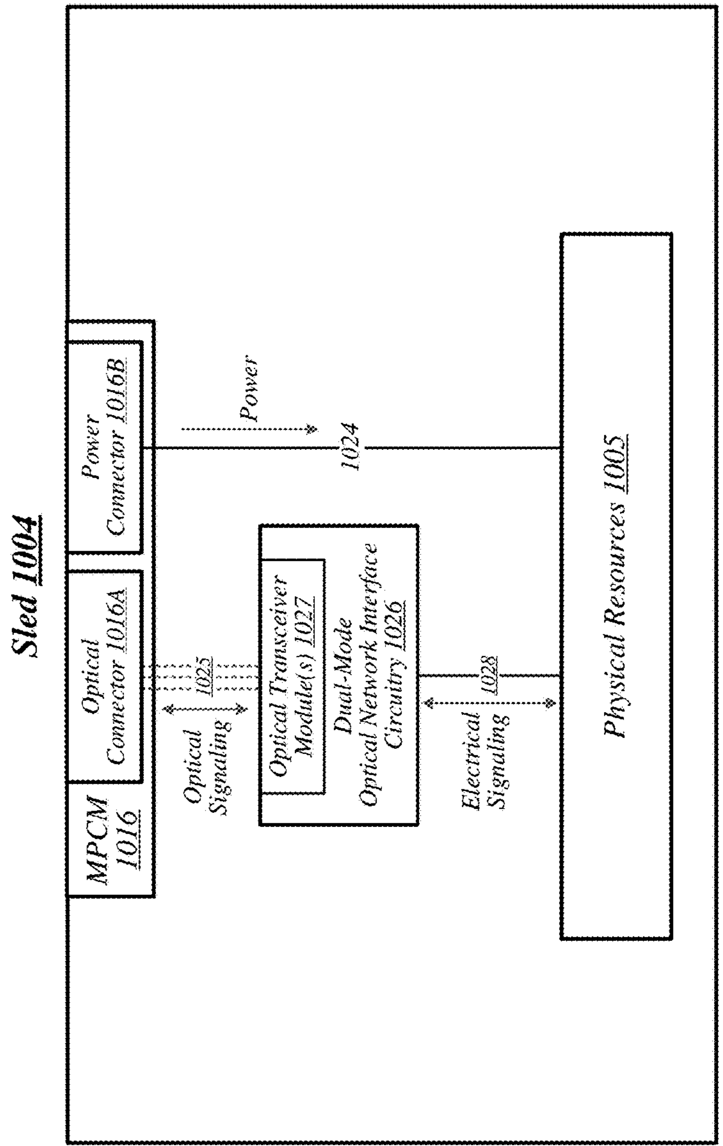
FIG. 10 illustrates an example of a sled.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heatpipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
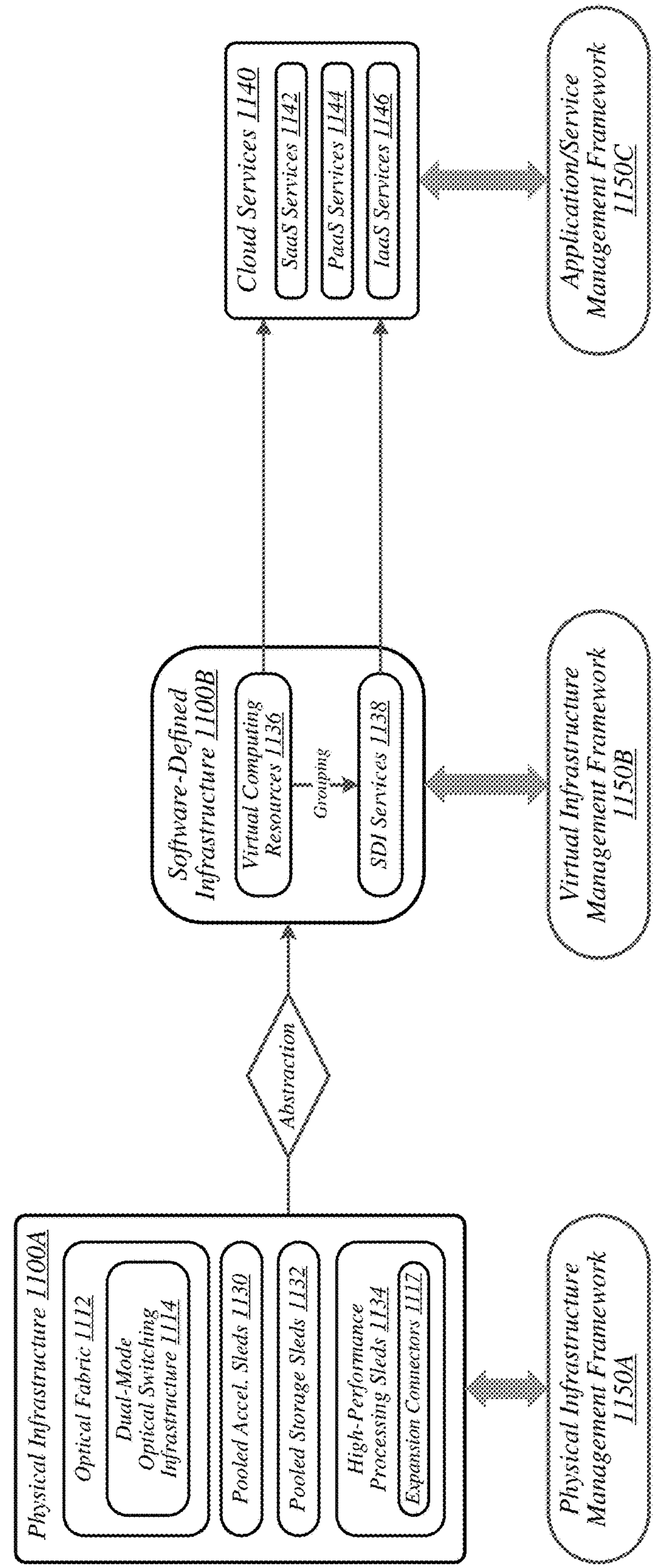
FIG. 11 illustrates an example of a data center.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is available globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Figure 12:
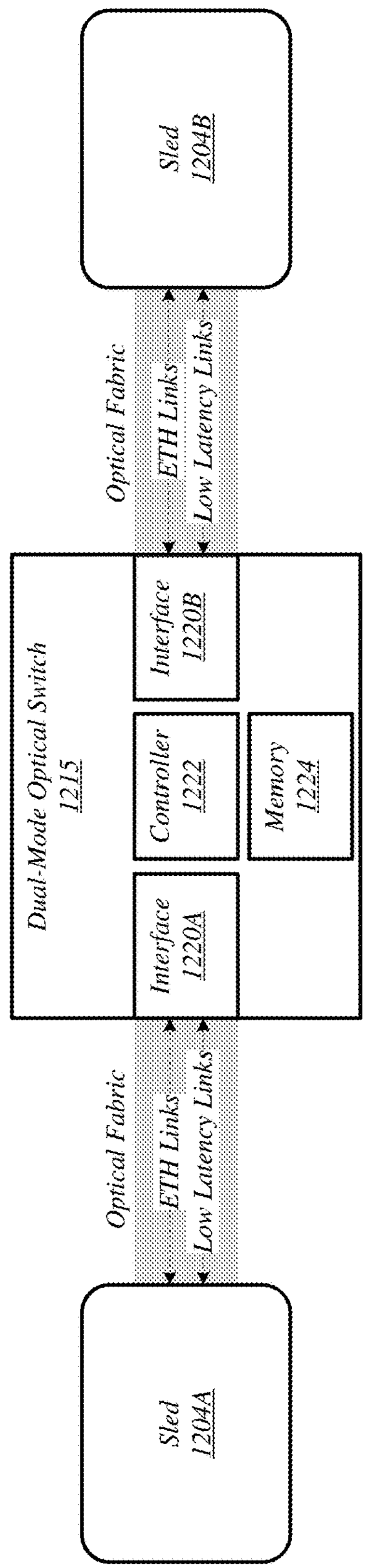
FIG. 12 illustrates an example of a dual-mode switch system.

FIG. 12 illustrates an overview of a connectivity scheme 1200 that may generally be representative of link-layer connectivity that may be established in some embodiments among the various sleds of a data center, such as any of example data centers 100, 300, and 400 of FIGS. 1, 3, and 4. Connectivity scheme 1200 may be implemented using an optical fabric that features dual-mode optical switching. The Dual-mode optical switching may enable a switching infrastructure that is capable of receiving communications according to multiple link-layer protocols via a same unified set of optical signaling media, e.g. fiber optic interconnects, and properly switching such communications. In various embodiments, dual-mode optical switching one or more dual-mode optical switches 1215. In various embodiments, dual-mode optical switches 1215 may generally comprise high-radix switches. In some embodiments, dual-mode optical switches 1215 may comprise multi-ply switches, such as four-ply switches. In various embodiments, the dual-mode optical switches 1215 may feature integrated silicon photonics that enable them to switch communications with significantly reduced latency in comparison to conventional switching devices. In some embodiments, dual-mode optical switches 1215 may constitute leaf switches in a leaf-spine architecture additionally including one or more dual-mode optical spine switches, as previously discussed in FIG. 5.

In various embodiments, a dual-mode optical switch 1215 may be capable of receiving both Ethernet protocol communications and low latency protocol communications e.g., Intel's® Omni-Path Architecture including Quick-Path® and Ultra-Path® interconnects, Infiniband, Peripheral Component Interconnect Express (PCIe)), and other proprietary low latency protocols via optical signaling media of an optical fabric. In some embodiments, the low latency protocol can communicate data with a latency of approximately 100 nanoseconds, while the Ethernet protocol typically has a latency of approximately of 400 nanoseconds.

In the illustrated example, the dual-mode optical switch 1215 includes interfaces 1220A and 1220B, each of which may couple to the optical fabric and fabric interconnects to support both Ethernet and low latency communications. The interfaces 1220A and 1220B may include circuitry, such as an optical transceiver, to send and receive communications via the optical fiber. For example, interface 1220A may receive and send Ethernet and low latency communications with sled 1204A. Similarly, interface 1220B may receive and send Ethernet and low latency communications with sled 1204B. Thus, the dual-mode optical switch 1215 provides support for link-layer connectivity via both Ethernet links and low latency links coupled with sleds 1204A and 1204B via interfaces 1220A and 1220B. Note that the illustrated embodiment includes two interfaces 1220A and 1220B, each coupled with a sled 1204A and 1204B, respectively. Embodiments are not limited in this manner. In embodiments, the dual-mode optical switch 1215 may include any number of interfaces 1220 coupled with any number of sleds 1204.

In embodiments, the dual-mode optical switch 1215 may also include a controller 1222 coupled memory 1224 and the interfaces 1220A and 1220B. The controller 1222 may be a processor, a computer processing unit, a single core processor, a multi-core processor, or any other type of processor that may execute and process one or more instructions to perform operations discussed herein. Moreover, the controller 1222 may process one or more instructions that are stored in memory 1224, which may be any type of non-volatile memory.

The controller 1222 can receive one or more packets via the interfaces 1220A and 1220B, determine a switch mode for each of the one or more packets, and process each of the packets in accordance with the appropriate protocol based on the switch mode. Further, each of the packets may include a switch mode indicator that may be used by the controller 1222 to determine the switch mode and appropriate protocol for the packet. In one example, the switch mode indicator may be a single bit in the packet, such that when it is set to "1" it indicates an Ethernet switch mode and the packet to be processed in accordance with the Ethernet protocol and when it is set to "0" it indicates a low latency switch mode and the packet is to be processed in accordance with the low latency protocol. Thus, the controller 1222 may read a switch mode indicator field, determine whether the switch mode indicator field includes a "1" or "0" and process the packet accordingly. Note that embodiments are not limited to the example logic. For instance, a "1" may indicate that the packet is to be processed in accordance with the low latency protocol and a "0" may indicate that the packet is to be processed in accordance with the Ethernet protocol.

Further, embodiments are not limited to a single bit to indicate a switch mode. In some instances multiple bits may be used to indicate a switch and embodiments may include more than two switch modes supported by a switch. For example, four (4) bits may be used to indicate four different switch modes.

In some embodiments, the controller 1222 may determine the switch mode and send the packet to circuitry to process the packet in accordance with the Ethernet protocol based on the switch mode indicator and send the packet to different circuitry to process the packet in accordance with the low latency protocol. In embodiments, the circuitry to process in accordance the Ethernet protocol and the circuitry to process in accordance with the low latency protocol may be part of the controller, on the same chipset, or on different chipsets. Embodiments are not limited in this manner.

The controller 1222 may also cause the packet to be sent to a destination via a first data path based on the switch mode when processing in accordance with the Ethernet protocol. The first data path may include one or more Ethernet links. The controller 122 may also cause the packet to be sent to a destination via a second data path based on the switch mode when processing accordance with the low latency protocol. The second data path may include one or more low latency links. Further, the destination may be a sled, another switch, or any other end point. Note that in embodiments at least a portion of the first path and the second path may be internal to the same chip, e.g. the controller 1222 or another processing chip. Embodiments are not limited in this manner.

Figure 13:
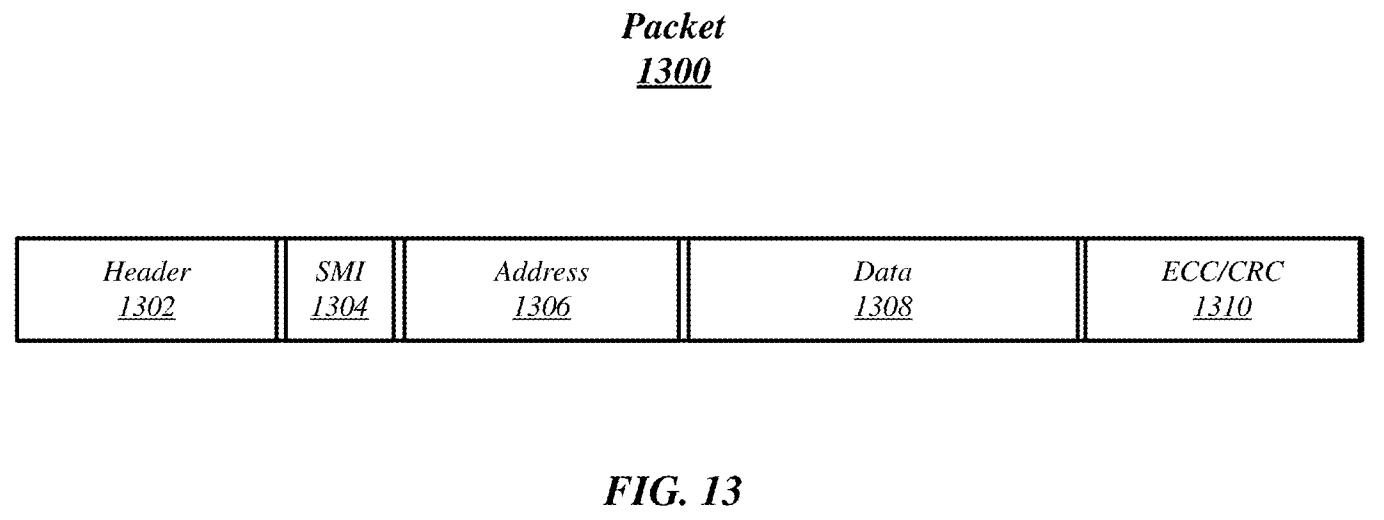

FIG. 13 illustrates one example packet 1300 that may be used to communicate data in accordance with link-layer protocol, such as an Ethernet protocol or a low latency protocol. The packet 1300 may be processed via the Ethernet protocol or the low latency protocol based on the switch mode indicator in the switch mode indicator field 1304.

The packet 1300 may also include other fields, including a header 1302, one or more addresses 1306, data 1308, and error correction code/cyclic redundancy check information 1310. The header 1302 may include information based on whether the packet 1300 is an Ethernet packet or a low latency packet as indicated by the switch mode indicator. For example, an Ethernet packet may include information in accordance with the Ethernet protocol in the header and processed accordingly. In another example, a low latency packet may include information in accordance with the low latency protocol in the header and processed accordingly. The information for processing the low latency packet is less than the information for processing in the Ethernet packet, which contributes to the low latency. In some embodiments, the information may be the same.

The address field 1306 may include in a destination address for the packet. The destination address may be an identifier to identify the destination of the packet 1300, such as Internet Protocol (IP) address. The destination address may be based on the protocol utilized to send the packet 1300, e.g. an Ethernet protocol or low latency protocol. In some embodiments, the address field 1306 may also include a source address, which may be the address of the sending sled. Embodiments are not limited in this manner. Moreover, the data field 1308 may include data and the ECC/CRC field 1310 may include ECC and/or CRC codes to do error correction.

Figure 14:
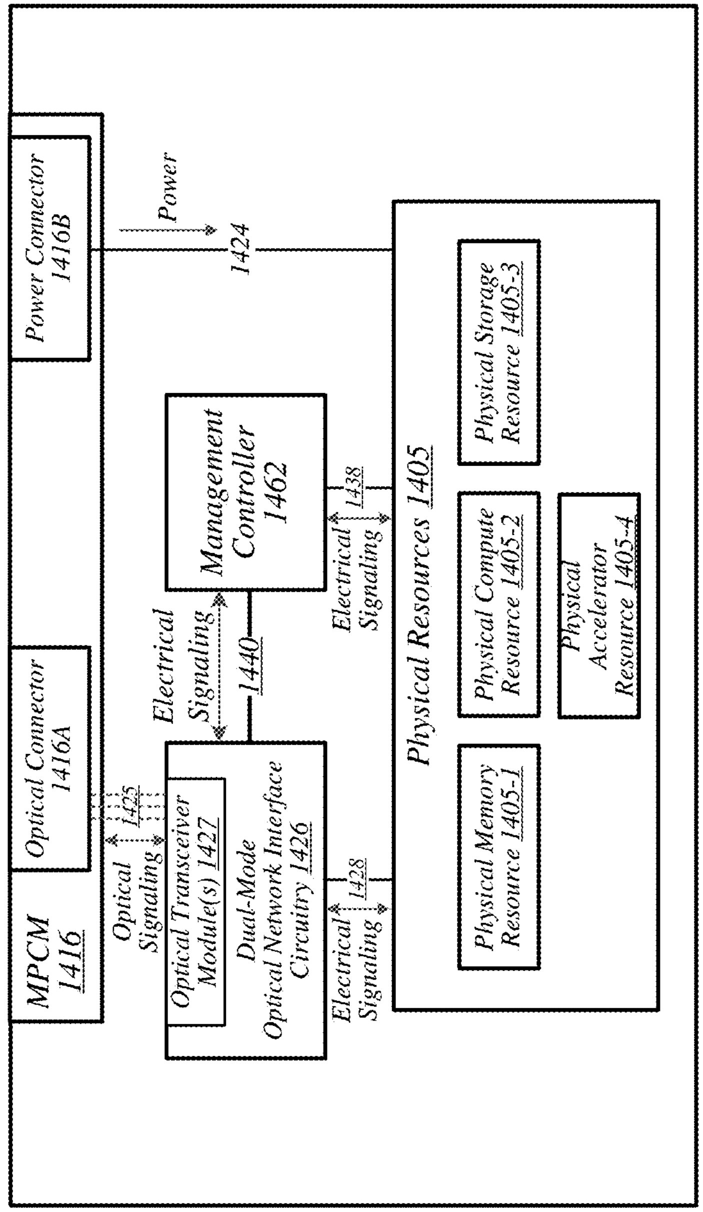
FIG. 14 illustrates an example of a sled.

FIG. 14 illustrates an example of a sled 1404 that may be representative of a sled designed for use in conjunction with the racks discussed herein, for example. In embodiments, sled 1404 may be similar to and have similar components and functionality as sled 1004 discussed in FIG. 10. Sled 1404 may feature an MPCM 1416 that which may include an optical connector 1416A, and a power connector 1416B, and that is designed to couple with a counterpart MPCM of a sled space in conjunction with insertion of MPCM 1416 into that sled space. Coupling MPCM 1416 with such a counterpart MPCM may cause power connector 1416B to couple with a power connector comprised in the counterpart MPCM. This may enable physical resources 1405 of sled 1404 to source power from an external source, via power connector 1416B and power transmission media 1424 that conductively couples power connector 1416 to physical resources 1405.

Sled 1404 may also include dual-mode optical network interface circuitry 1426. Dual-mode optical network interface circuitry 1426 may include circuitry that is capable of communicating over optical signaling media according to each of multiple link-layer protocols, e.g. Ethernet protocol and a low latency protocol, supported by dual-mode optical switching infrastructure, as previously discussed in FIG. 12. In various embodiments, the dual-mode optical network interface circuitry 1426 may include one or more optical transceiver modules 1427, each of which may be capable of transmitting and receiving optical signals over each of one or more optical channels. The embodiments are not limited in this context.

Coupling MPCM 1416 with a counterpart MPCM of a sled space in a given rack may cause optical connector 1416A to couple with an optical connector comprised in the counterpart MPCM. This may establish optical connectivity between optical cabling of the sled and dual-mode optical network interface circuitry 1426, via each of a set of optical channels 1425. Dual-mode optical network interface circuitry 1426 may communicate with the physical resources 1405 of sled 1404 via electrical signaling media 1428.

In embodiments, the dual-mode optical network interface circuitry 1426 may process packets sent and received via the optical fabric. In some embodiments, the dual-mode optical network interface circuitry 1426 may receive a packet, determine a switch mode for the packet, and process the packet accordingly. For example, the dual-mode optical network interface circuitry 1426 determine a packet is an Ethernet packet having an Ethernet switch mode indication in a switch mode indicator field. The dual-mode optical network interface circuitry 1426 may process the packet utilizing the Ethernet protocol via an Ethernet protocol stack. In another example, the dual-mode optical network interface circuitry 1426 may determine the packet is a low latency packet having a low latency switch mode indication in the switch mode indicator field. The dual-mode optical network interface circuitry 1426 may process the packet utilizing the low latency protocol via a low latency protocol stack. Embodiments are not limited to these examples.

The dual-mode optical network interface circuitry 1426 may also send packets to other devices or sleds utilizing the Ethernet protocol or low latency protocol. In some instances, the dual-mode optical network interface circuitry 1426 may construct at least a portion of the packet to send to other devices or sleds. For example, the dual-mode optical network interface circuitry 1426 may set one or more bits as a switch mode indicator in a switch mode indicator field to indicate whether the packet should be processed in accordance with the Ethernet protocol or the low latency protocol. For example, the dual-mode optical network interface circuitry 1426 may set a bit to "1" in the switch mode indicator field to cause the packet to be processed in accordance with the Ethernet protocol and set a bit to "0" in the switch mode indicator field to cause the packet to be processed in accordance with the low latency protocol. In some embodiments, the opposite logic may be used and embodiments are not limited in this manner. Moreover, more than one bit may be used to indicate a switch mode.

The sled 1404 may also include a management controller 1462, which may be part of an Intelligent Platform Management Interface (IPMI) architecture and may be a baseboard management controller (BMC) or specialized service processor that monitors the physical state and operational state of the physical resources 1405 using sensors and communicating with the physical resources 1405 themselves. In some instances, the management controller 1462 may be a sled management controller for physical resources 1405, including but not limited to, physical memory resources 1405-1, physical compute resources 1405-2, physical storage resources 1405-3, and physical accelerator resources 1405-4. Embodiments are not limited in this manner.

A physical memory resource 1405-1 may be any type of memory, such as any machine-readable or computer-readable media capable of storing data, including both volatile and non-volatile memory. In some embodiments, the machine-readable or computer-readable medium may include a non-transitory medium. Moreover, a physical memory resource 1405-1 may include one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD), 3D Xpoint®, and any other type of storage media suitable for storing information. Embodiments are not limited to these examples.

A physical compute resource 1405-2 may be any type of circuitry capable of processing information. Moreover, a physical compute resources 1405-2 may be implemented using any processor or logic device. The physical compute resource 1405-2 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. The physical compute resource 1405-2 may be connected to and communicate with the other physical resources 1405 of the computing system via an interconnect, such as one or more buses, control lines, and data lines.

In embodiments, a physical storage resource 1405-3 may be any type of storage, and may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, a physical storage resource 1405-3 may include technology to increase the storage performance enhanced protection for valuable digital media when multiple hard drives are included, for example. Further examples of physical storage resource 1405-3 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

A physical accelerator resource 1405-4 may be any type of accelerator device designed to increase processing power of a processor, such as the physical compute resource 1405-2. The physical accelerator resource 1405-4 accelerates transmission or processing beyond processor capabilities. In one example, a physical accelerator resource 1405-4 may compute faster floating-point units (FPUs) by assisting in math calculations or by increasing speed. In another example, the physical accelerator resource 1405-4 may be a graphics processing units (GPUs) for 3-D images or faster graphic displays. Embodiments, the physical accelerator resource 1405-4 may be implemented as field programmable gate arrays (FPGAs); however, embodiments are not limited in this manner.

The management controller 1462 may collect metric data for one or more of the physical resources 1405 via one or more interconnects 1438 and electrical signals. The interconnects 1438 may be a low pin count (LPC) bus, a system management bus (SMBus), an Inter-Integrated (I2C) bus, an IPMI utilizing the SMBus, and a serial port. Embodiments are not limited to these examples.

Figure 15:
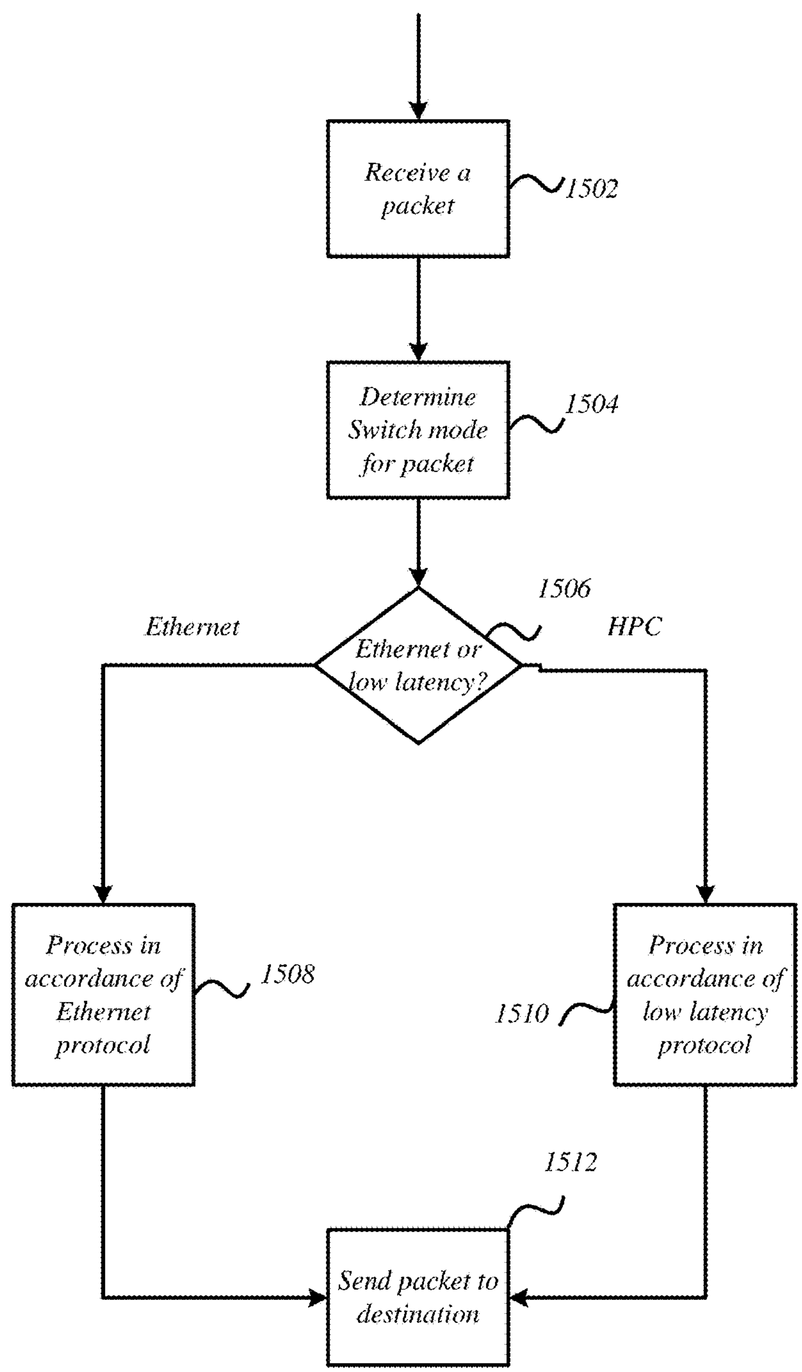
FIG. 15 illustrates an example of a first logic flow.

FIG. 15 illustrates an embodiment of logic flow 1500. The logic flow 1500 may be representative of some or all of the operations executed by one or more embodiments described herein. For example, the logic flow 1500 may illustrate operations performed by a switch, as discussed herein. However, embodiments are not limited in this, and one or more operations may be performed by other components or systems discussed herein.

At block 1502, the logic flow 1500 includes receiving a packet including a switch mode indicator. The packet may also include data and may be similar to or the same as packet 1300 illustrated in FIG. 13. The packet may be received from a sled and is intended to go to another sled for processing. The switch may ensure that the packet is processed and sent to the correct destination, which may be a sled having one or more physical resources, for example.

At block 1504, the logic flow 1500 includes determining the switch mode for the packet. More specifically, the switch may read or analyze a switch mode indicator field to determine the switch mode. The switch mode may indicate whether the packet is an Ethernet packet to be processed in accordance with the Ethernet protocol or a low latency packet to be processed in accordance with the low latency protocol.

If at decision block 1506, the logic flow 1500 determines the packet indicates an Ethernet switch mode, the logic flow 1500 includes processing the packet in accordance with the Ethernet protocol at block 1508. Similarly, if at decision block 1506, the logic flow 1500 includes determining that the packet indicates a low latency switch mode, the logic flow 1500 includes processing the packet in accordance with the low latency protocol at block 1510.

At block 1512, the logic flow 1500 includes sending the packet to a destination, such as another switch or a sled. The switch may send the packet to the destination based on an address in the address field of the packet.

Figure 16:
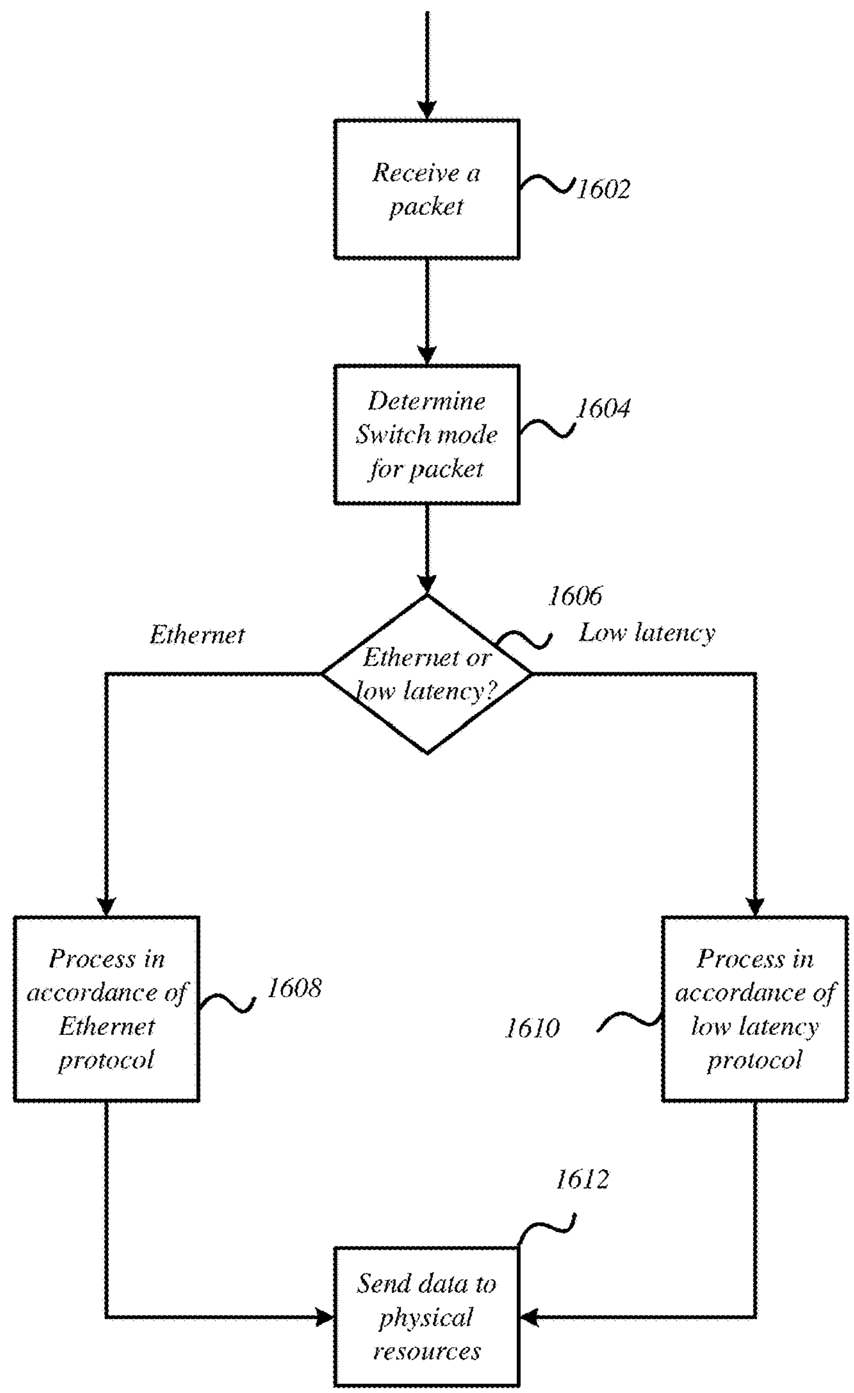
FIG. 16 illustrates an example of a second logic flow.

FIG. 16 illustrates an embodiment of logic flow 1600. The logic flow 1600 may be representative of some or all of the operations executed by one or more embodiments described herein. For example, the logic flow 1600 may illustrate operations performed by a dual-mode optical network interface circuitry to process a received packet from another sled, as discussed herein. However, embodiments are not limited in this, and one or more operations may be performed by other components or systems discussed herein.

At block 1602, the logic flow 1600 includes receiving a packet including a switch mode indicator. The packet may also include data and may be similar to or the same as packet 1300 illustrated in FIG. 13. The packet may be received from another sled via a switch.

At block 1604, the logic flow 1600 includes determining the switch mode for the packet. More specifically, the switch may read or analyze a switch mode indicator field of the packet to determine the switch mode. The switch mode may indicate whether the packet is an Ethernet packet to be processed in accordance with the Ethernet protocol or a low latency packet to be processed in accordance with the low latency protocol.

If at decision block 1606, the dual-mode optical network interface circuitry determines the packet indicates an Ethernet switch mode, the logic flow 1600 includes processing the packet in accordance with the Ethernet protocol at block 1608. Similarly, if at decision block 1606, the dual-mode optical network interface circuitry includes determining that the packet indicates a low latency switch mode, the logic flow 1600 includes processing the packet in accordance with the low latency protocol at block 1610.

At block 1612, the logic flow 1600 includes sending the data to a physical resource for processing.

Figure 17:
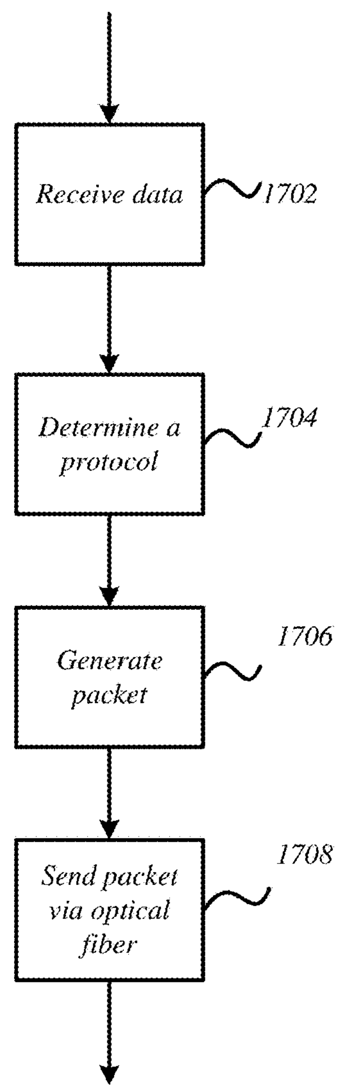
FIG. 17 illustrates an example of a third logic flow.

FIG. 17 illustrates an embodiment of logic flow 1700. The logic flow 1700 may be representative of some or all of the operations executed by one or more embodiments described herein. For example, the logic flow 1700 may illustrate operations performed by a dual-mode optical network interface circuitry to send a packet to another sled, as discussed herein. However, embodiments are not limited in this, and one or more operations may be performed by other components or systems discussed herein.

At block 1702, the logic flow 1700 includes receiving data to send to another sled for processing. In embodiments, the dual-mode optical network interface circuitry may receive the data from a physical resource, such as a physical compute resource that desires to have the data processed by another physical resource, such as a physical accelerator resource, of another sled.

At block 1704, the logic flow 1700 includes determine a protocol to communicate the packet. In some embodiments, the protocol may be based on information received with the data. For example, a physical resource may indicate that the data is to be sent via an Ethernet protocol or a low latency protocol. In another example, the dual-mode optical network interface circuitry may receive an indication or signal from the management controller indicating which protocol to use.

At block 1706, the logic flow 1700 includes generating a packet with the data to send to another sled. For example, the dual-mode optical network interface circuitry may generate a packet, which may be similar to or the same was packet 1300 of FIG. 13. In embodiments, the dual-mode optical network interface circuitry may include a switch mode indicator in the packet such that a switch may determine which protocol to utilize when processing and sending the packet, e.g. the Ethernet protocol or low latency protocol.

At block 1708 the logic flow 1700 includes sending the packet via the optical fabric. In embodiments, the dual-mode optical network interface circuitry may send the packet utilizing an optical transceiver module, as previously discussed. Embodiments are not limited in this manner.

The detailed disclosure now turns to providing examples that pertain to further embodiments. Examples one through xx (1-xx) provided below are intended to be exemplary and non-limiting.

In a first example, a system, a device, an apparatus, and so forth may include a controller and memory storing instructions operable on the controller, the instructions, when executed, cause the controller to receive a packet via an optical fabric, the packet comprising a switch mode indicator, determine a switch mode for the packet based on the switch mode indicator, and process the packet in accordance with a first protocol or a second protocol based on the switch mode.

In a second example and in furtherance of the first example, a system, a device, an apparatus, and so forth including the switch mode comprising an Ethernet switch mode and the controller to process the packet in accordance with the first protocol comprising an Ethernet protocol.

In a third example and in furtherance of any of the previous examples, a system, a device, an apparatus, and so forth including the switch mode comprising a low latency switch mode and the controller to process the packet in accordance with the second protocol comprising a low latency protocol.

In a fourth example and in furtherance of any of the previous examples, a system, a device, an apparatus, and so forth including the controller to send the packet to a sled via a first data path comprising one or more Ethernet links when the packet is processed in accordance with the first protocol.

In a fifth example and in furtherance of any of the previous examples, a system, a device, an apparatus, and so forth including the controller to send the packet to a sled via a second data path comprising one or more low latency links when the packet is processed in accordance with the second protocol.

In a sixth example and in furtherance of any of the previous examples, a system, a device, an apparatus, and so forth including the packet comprising the switch mode indicator in a switch mode indicator field, the switch mode indicator including one or more bits to indicate the switch mode for the packet, the controller to determine the switch mode is an Ethernet switch mode or a low latency switch mode based on the one or more bits.

In a seventh example and in furtherance of any of the previous examples, a system, a device, an apparatus, and so forth including a dual-mode optical switch comprising the controller, the memory, and an optical network interface coupled with the optical fabric.

In an eighth example and in furtherance of any of the previous examples a non-transitory computer-readable storage medium, comprising a plurality of instructions, that when executed, enable processing circuitry to receive a packet via an optical fabric, the packet comprising a switch mode indicator, determine a switch mode for the packet based on the switch mode indicator, and process the packet in accordance with a first protocol or a second protocol based on the switch mode.

In a ninth example and in furtherance of any of the previous examples a non-transitory computer-readable storage medium, comprising a plurality of instructions, that when executed, enable processing circuitry to process the packet in accordance with the first protocol comprising an Ethernet protocol.

In a tenth example and in furtherance of any of the previous examples a non-transitory computer-readable storage medium, comprising a plurality of instructions, that when executed, enable processing circuitry to process the switch mode comprising a low latency switch mode and the processing circuitry to process the packet in accordance with the second protocol comprising a low latency protocol.

In an eleventh example and in furtherance of any of the previous examples a non-transitory computer-readable storage medium, comprising a plurality of instructions, that when executed, enable processing circuitry to send the packet to a sled via a first data path comprising one or more Ethernet links when the packet is processed in accordance with the first protocol.

In a twelfth example and in furtherance of any of the previous examples a non-transitory computer-readable storage medium, comprising a plurality of instructions, that when executed, enable processing circuitry to send the packet to a sled via a second data path comprising one or more low latency links when the packet is processed in accordance with the second protocol.

In a thirteenth example and in furtherance of any of the previous examples a non-transitory computer-readable storage medium, comprising a plurality of instructions, that when executed, enable processing circuitry to process the packet comprising the switch mode indicator in a switch mode indicator field, the switch mode indicator including one or more bits to indicate the switch mode for the packet, the processing circuitry to determine the switch mode is an Ethernet switch mode or a low latency switch mode based on the one or more bits.

In a fourteenth example and in furtherance of any of the previous examples a computer-implemented method including receiving a packet via an optical fabric, the packet comprising a switch mode indicator, determining a switch mode for the packet based on the switch mode indicator, and processing the packet in accordance with a first protocol or a second protocol based on the switch mode.

In a fifteenth example and in furtherance of any of the previous examples a computer-implemented method including processing the packet in accordance with the first protocol comprising an Ethernet protocol when the switch mode comprising an Ethernet switch mode.

In a sixteenth example and in furtherance of any of the previous examples a computer-implemented method including processing the packet in accordance with the second protocol comprising a low latency protocol when the switch mode comprising a low latency switch mode.

In a seventeenth example and in furtherance of any of the previous examples a computer-implemented method including sending the packet to a sled via a first data path comprising one or more Ethernet links when the packet is processed in accordance with the first protocol.

In an eighteenth example and in furtherance of any of the previous examples a computer-implemented method including sending the packet to a sled via a second data path comprising one or more low latency links when the packet is processed in accordance with the second protocol.

In a nineteenth example and in furtherance of any of the previous examples a computer-implemented method including processing the packet comprising the switch mode indicator in a switch mode indicator field, the switch mode indicator including one or more bits to indicate the switch mode for the packet.

In a twentieth example and in furtherance of any of the previous examples, a system, a device, an apparatus, and so forth including interface circuitry and memory storing instructions operable on the interface circuitry, the instructions, when executed, cause the interface circuitry to receive a packet via an optical fabric, the packet comprising a switch mode indicator, determine a switch mode for the packet based on the switch mode indicator, and process the packet in accordance with a first protocol or a second protocol based on the switch mode.

In a twenty-first example and in furtherance of any of the previous examples, a system, a device, an apparatus, and so forth including the switch mode comprising an Ethernet switch mode and the interface circuitry to process the packet in accordance with the first protocol comprising an Ethernet protocol.

In a twenty-second example and in furtherance of any of the previous examples, a system, a device, an apparatus, and so forth including processing the switch mode comprising a low latency switch mode and the interface circuitry to process the packet in accordance with the second protocol comprising a low latency protocol.

In a twenty-third example and in furtherance of any of the previous examples, a system, a device, an apparatus, and so forth including the interface circuitry to send the packet to a physical resource for processing.

In a twenty-fourth example and in furtherance of any of the previous examples, a system, a device, an apparatus, and so forth including the interface circuitry to receive data to send to a sled, determine a switch mode for another packet to send the data, and set another switch mode indicator in the another packet based on the switch mode determined.

In a twenty-fifth example and in furtherance of any of the previous examples, a system, a device, an apparatus, and so forth including a controller and physical resources, the interface circuitry coupled with the controller and physical resources and to communicate data for the physical resources via an optical transceiver module.

In a twenty-sixth example and in furtherance of any of the previous examples, a non-transitory computer-readable storage medium, comprising a plurality of instructions, that when executed, enable processing circuitry to receive a packet via an optical fabric, the packet comprising a switch mode indicator, determine a switch mode for the packet based on the switch mode indicator, and process the packet in accordance with a first protocol or a second protocol based on the switch mode.

In a twenty-seventh example and in furtherance of any of the previous examples, a non-transitory computer-readable storage medium, comprising a plurality of instructions, that when executed, enable processing circuitry to process the packet in accordance with the first protocol comprising an Ethernet protocol when the switch mode is an Ethernet switch mode.

In a twenty-eighth example and in furtherance of any of the previous examples, a non-transitory computer-readable storage medium, comprising a plurality of instructions, that when executed, enable processing circuitry to process the packet in accordance with the second protocol comprising a low latency protocol when the switch mode is a low latency switch mode.

In a twenty-ninth example and in furtherance of any of the previous examples, a non-transitory computer-readable storage medium, comprising a plurality of instructions, that when executed, enable processing circuitry to send the packet to a physical resource for processing.

In a thirtieth example and in furtherance of any of the previous examples, a non-transitory computer-readable storage medium, comprising a plurality of instructions, that when executed, enable processing circuitry to receive data to send to a sled, determine a switch mode for another packet to send the data, and set another switch mode indicator in the another packet based on the switch mode determined.

In a thirty-first example and in furtherance of any of the previous examples, a computer-implemented method includes receiving a packet via an optical fabric, the packet comprising a switch mode indicator, determining a switch mode for the packet based on the switch mode indicator, and processing the packet in accordance with a first protocol or a second protocol based on the switch mode.

In a thirty-second example and in furtherance of any of the previous examples, a computer-implemented method includes processing the packet in accordance with the first protocol comprising an Ethernet protocol when the switch mode is an Ethernet switch mode.

In a thirty-third example and in furtherance of any of the previous examples, a computer-implemented method includes processing the packet in accordance with the second protocol comprising a low latency protocol when the switch mode is a low latency switch mode.

In a thirty-fourth example and in furtherance of any of the previous examples, a computer-implemented method includes sending the packet to a physical resource for processing.

In a thirty-fifth example and in furtherance of any of the previous examples, a computer-implemented method includes receiving data to send to a sled, determine a switch mode for another packet to send the data, and set another switch mode indicator in the another packet based on the switch mode determined.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. Also, in the preceding Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are at this moment incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:

a controller;

memory storing instructions operable on the controller, the instructions, when executed, cause the controller to:

receive a packet via an optical fabric, the packet comprising a switch mode indicator;

determine a switch mode for the packet based on the switch mode indicator;

process the packet in accordance with a first protocol or a second protocol based on the switch mode, wherein the switch mode changes which of the first protocol and the second protocol is used to process the packet; and send the packet to a remote compute device in accordance with the first protocol or the second protocol based on the switch mode.

2. The apparatus of claim 1, the switch mode comprising an Ethernet switch mode and the controller to process the packet in accordance with the first protocol comprising an Ethernet protocol.

3. The apparatus of claim 1, the switch mode comprising a low latency switch mode and the controller to process the packet in accordance with the second protocol comprising a low latency protocol.

4. The apparatus of claim 1, the controller to send the packet to a sled via a first data path comprising one or more Ethernet links when the packet is processed in accordance with the first protocol.

5. The apparatus of claim 1, the controller to send the packet to a sled via a second data path comprising one or more low latency links when the packet is processed in accordance with the second protocol.

6. The apparatus of claim 1, the packet comprising the switch mode indicator in a switch mode indicator field, the switch mode indicator including one or more bits to indicate the switch mode for the packet, the controller to determine the switch mode is an Ethernet switch mode or a low latency switch mode based on the one or more bits.

7. The apparatus of claim 1, comprising a dual-mode optical switch comprising the controller, the memory, and an optical network interface coupled with the optical fabric.

8. The apparatus of claim 1, wherein to process the packet in accordance with the first protocol or the second protocol based on the switch mode comprises to send the packet to a remote compute device in accordance with the first protocol or the second protocol based on the switch mode.

9. The apparatus of claim 8, wherein the instructions, when executed, further cause the controller to:

receive a second packet via the optical fabric, wherein the second packet comprises a second switch mode indicator and is immediately following the packet;

determine a second switch mode for the second packet based on the second switch mode indicator; and send the second packet to a second remote compute device in accordance with the first protocol or the second protocol based on the second switch mode and independent of the switch mode of the packet.

10. A non-transitory computer-readable storage medium, comprising a plurality of instructions, that when executed, enable processing circuitry to:

receive a packet via an optical fabric, the packet comprising a switch mode indicator;

determine a switch mode for the packet based on the switch mode indicator; process the packet in accordance with a first protocol or a second protocol based on the switch mode, wherein the switch mode changes which of the first protocol and the second protocol is used to process the packet; and send the packet to a remote compute device in accordance with the first protocol or the second protocol based on the switch mode.

11. The non-transitory computer-readable storage medium of claim 10, the switch mode comprising an Ethernet switch mode and the processing circuitry to process the packet in accordance with the first protocol comprising an Ethernet protocol.

12. The non-transitory computer-readable storage medium of claim 10, the switch mode comprising a low latency switch mode and the processing circuitry to process the packet in accordance with the second protocol comprising a low latency protocol.

13. The non-transitory computer-readable storage medium of claim 10, comprising a plurality of instructions, that when executed, enable processing circuitry to send the packet to a sled via a first data path comprising one or more Ethernet links when the packet is processed in accordance with the first protocol.

14. The non-transitory computer-readable storage medium of claim 10, comprising a plurality of instructions, that when executed, enable processing circuitry to send the packet to a sled via a second data path comprising one or more low latency links when the packet is processed in accordance with the second protocol.

15. The non-transitory computer-readable storage medium of claim 10, the packet comprising the switch mode indicator in a switch mode indicator field, the switch mode indicator including one or more bits to indicate the switch mode for the packet, the processing circuitry to determine the switch mode is an Ethernet switch mode or a low latency switch mode based on the one or more bits.

16. A computer-implemented method, comprising:

receiving a packet via an optical fabric, the packet comprising a switch mode indicator;

determining a switch mode for the packet based on the switch mode indicator;

processing the packet in accordance with a first protocol or a second protocol based on the switch mode, wherein the switch mode changes which of the first protocol and the second protocol is used to process the packet; and sending the packet to a remote compute device in accordance with the first protocol or the second protocol based on the switch mode.

17. The computer-implemented method of claim 16, comprising processing the packet in accordance with the first protocol comprising an Ethernet protocol when the switch mode indicates an Ethernet switch mode.

18. The computer-implemented method of claim 16, comprising processing the packet in accordance with the second protocol comprising a low latency protocol when the switch mode indicates a low latency switch mode.

19. The computer-implemented method of claim 16, the packet comprising the switch mode indicator in a switch mode indicator field, the switch mode indicator including one or more bits to indicate the switch mode for the packet.

20. The computer-implemented method of claim 16, comprising determining the packet is an Ethernet packet based on the switch mode indicator, processing the packet in accordance with the first protocol comprising an Ethernet protocol.

21. The computer-implemented method of claim 16, comprising determining the packet is a low latency packet based on the switch mode indicator, processing the packet in accordance with the second protocol comprising a low latency protocol.

22. An apparatus, comprising:

interface circuitry;

memory storing instructions operable on the interface circuitry, the instructions, when executed, cause the interface circuitry to:

receive a packet via an optical fabric, the packet comprising a switch mode indicator;

determine a switch mode for the packet based on the switch mode indicator;

process the packet in accordance with a first protocol or a second protocol based on the switch mode, wherein the switch mode changes which of the first protocol and the second protocol is used to process the packet; and send the packet to a remote compute device in accordance with the first protocol or the second protocol based on the switch mode.

23. The apparatus of claim 22, the switch mode comprising an Ethernet switch mode and the interface circuitry to process the packet in accordance with the first protocol comprising an Ethernet protocol.

24. The apparatus of claim 22, the switch mode comprising a low latency switch mode and the interface circuitry to process the packet in accordance with the second protocol comprising a low latency protocol.

25. The apparatus of claim 22, the interface circuitry to send the packet to a physical resource for processing.

26. The apparatus of claim 22, the interface circuitry to receive data to send to a sled, determine a switch mode for another packet to send the data, and set another switch mode indicator in the another packet based on the switch mode determined.

27. The apparatus of claim 22, comprising a controller and physical resources, the interface circuitry coupled with the controller and physical resources and to communicate data for the physical resources via an optical transceiver module.

* * * * *